United States Patent
Alarcon-Luther et al.

(10) Patent No.: US 7,313,546 B2
(45) Date of Patent: Dec. 25, 2007

(54) SYSTEM AND METHOD FOR CURRENCY SELECTABLE STORED VALUE INSTRUMENT

(75) Inventors: Melissa Alarcon-Luther, Arlington, VA (US); Debra C. Fellner, Wilmington, DE (US); Barry M. Sabloff, Winnetka, IL (US); Frank Charles Schell, III, Chicago, IL (US); Peter Mark Mesrobian, Kenilworth, IL (US); Ginger Griffin, Winnetka, IL (US); Michelle Dorion, London (GB); Gus Karris, Hawthorn Woods, IL (US)

(73) Assignee: JP Morgan Chase Bank, N.A., New York, NY (US)

( * ) Notice: Subject to any disclaimer, the term of this patent is extended or adjusted under 35 U.S.C. 154(b) by 610 days.

(21) Appl. No.: 09/983,901

(22) Filed: Oct. 26, 2001

(65) Prior Publication Data
US 2004/0153406 A1 Aug. 5, 2004

Related U.S. Application Data

(60) Provisional application No. 60/292,528, filed on May 23, 2001.

(51) Int. Cl.
*G06Q 17/06* (2006.01)
(52) U.S. Cl. .......................... 705/41; 705/75
(58) Field of Classification Search ............ 705/25–41, 705/70, 75
See application file for complete search history.

(56) References Cited

U.S. PATENT DOCUMENTS 3,946,206 A 3/1976 Darjany
4,047,033 A 9/1977 Maimberg
4,545,838 A 10/1985 Minkus
4,750,119 A 6/1988 Robertson et al.
4,766,293 A * 8/1988 Boston ........................ 705/41

(Continued)

FOREIGN PATENT DOCUMENTS

EP 0 843 292 A2 * 5/1998

OTHER PUBLICATIONS

"Visa International And SERMEPA Announce Plans for Cross Border Visa Cash Based on CEPS", http://www.visa.com/av/news/PRaaamisc111699.vhtml, Paris Nov. 16, 1999.*

(Continued)

Primary Examiner—Frantzy Poinvil
(74) Attorney, Agent, or Firm—Hunton & Williams LLP

(57) ABSTRACT

The invention provides a currency selectable stored value instrument, whose currency may be chosen or converted at the time value is loaded, after load but prior to redemption of value, at the time of redemption, or at other times. One embodiment of the system is configured so that the stored value instrument may be a plastic card with a magnetic stripe, compatible with card readers on Automated Teller Machines (ATMs) or other terminals. In one embodiment, U.S. dollars may be converted to Mexican pesos when the stored value instrument is loaded at an ATM or other location in the United States. A user may subsequently redeem that value for legal tender in pesos at an ATM located in Mexico, for example, or for goods, services, or cash in other currencies.

30 Claims, 4 Drawing Sheets

U.S. PATENT DOCUMENTS

| | | | | |
|---|---|---|---|---|
| 4,831,242 | A | | 5/1989 | Englehardt |
| 4,897,533 | A | | 1/1990 | Lyszczarz |
| 4,968,873 | A | * | 11/1990 | Dethloff et al. ............. 235/380 |
| 4,978,401 | A | | 12/1990 | Bonomi |
| 5,095,194 | A | | 3/1992 | Barbanell |
| 5,117,355 | A | | 5/1992 | McCarthy |
| 5,175,416 | A | | 12/1992 | Mansvelt |
| 5,192,947 | A | | 3/1993 | Neustein |
| 5,202,826 | A | | 4/1993 | McCarthy |
| 5,326,960 | A | | 7/1994 | Tannenbaum |
| 5,397,881 | A | | 3/1995 | Mannik |
| 5,424,524 | A | | 6/1995 | Ruppert |
| 5,450,477 | A | | 9/1995 | Amarant |
| 5,465,206 | A | | 11/1995 | Hilt |
| 5,471,669 | A | | 11/1995 | Lidman |
| 5,477,038 | A | * | 12/1995 | Levine et al. ............... 235/380 |
| 5,482,139 | A | | 1/1996 | Rivalto |
| 5,500,514 | A | | 3/1996 | Veeneman |
| 5,530,232 | A | | 6/1996 | Taylor |
| 5,578,808 | A | * | 11/1996 | Taylor ........................ 235/380 |
| 5,585,787 | A | | 12/1996 | Wallerstein |
| 5,590,038 | A | * | 12/1996 | Pitroda ........................ 705/41 |
| 5,637,845 | A | | 6/1997 | Kolls |
| 5,703,344 | A | | 12/1997 | Bezy |
| 5,710,886 | A | | 1/1998 | Christensen |
| 5,721,768 | A | | 2/1998 | Stimson |
| 5,765,141 | A | | 6/1998 | Spector |
| 5,777,305 | A | | 7/1998 | Smith |
| 5,778,067 | A | * | 7/1998 | Jones et al. ................... 705/65 |
| 5,787,404 | A | | 7/1998 | Fernandez-Holman |
| 5,857,079 | A | | 1/1999 | Claus |
| 5,857,709 | A | | 1/1999 | Chock |
| 5,864,830 | A | | 1/1999 | Armetta |
| 5,870,718 | A | | 2/1999 | Spector |
| 5,926,800 | A | | 7/1999 | Baronowski |
| 5,955,961 | A | | 9/1999 | Wallerstein |
| 5,991,750 | A | | 11/1999 | Watson |
| 6,016,954 | A | | 1/2000 | Abe |
| 6,032,135 | A | * | 2/2000 | Molano et al. ............... 705/41 |
| 6,036,099 | A | | 3/2000 | Leighton |
| 6,038,552 | A | | 3/2000 | Fleischl |
| 6,076,075 | A | * | 6/2000 | Teicher ........................ 705/41 |
| 6,105,007 | A | * | 8/2000 | Norris ......................... 705/38 |
| 6,119,946 | A | * | 9/2000 | Teicher ........................ 705/41 |
| 6,188,993 | B1 | | 2/2001 | Eng et al. |
| 6,205,433 | B1 | | 3/2001 | Boesch et al. |
| 6,206,283 | B1 | * | 3/2001 | Bansal et al. ............... 235/379 |
| 6,243,688 | B1 | | 6/2001 | Kalina |
| 6,298,336 | B1 | * | 10/2001 | Davis et al. .................. 705/41 |

OTHER PUBLICATIONS

CardEx Incentives, Apr. 6, 1999, www.cardexco.com.

"Associates First Capital Corporation", Hoover's Inc., The Industry Standard: The Newsmagazine of the Internet Economy, thestandard. net/companies/cpmpany-display, Apr. 6, 1999.

Jeffrey M. Lacker, "Stored Value Cards: Costly Private Substitutions for Government Currency", Economic Quarterly, 1996.

"The Evolution of a New Consumerism", Chain Store Age, vol. 73, pp. 8-9, Jun. 1997.

Lisa Fickenscher, "Amex prepaid offering is latest card for firms regardng employees", American Banker, vol. 161, No. 151, p.11, Aug. 8, 1996.

"Welcome to Swiftgift", Swiftgift, www.swiftgiftcard.com, Dec. 8, 1998.

Lucy Lzarony, "Stuck for a gift? Give a prepaid credit card", www.bankrate.com, Dec. 21, 1998.

Antoinette Coulton, "Incentives field moving to card-based series 14", American Banker, Mar. 26, 1998.

Credit Card News, "A store card issuer looks for lift from electronic gift certificates", Feb. 1, 1995.

Business Travel News, "Maritz gets mastercard's stamp of approval", Aug. 19, 1996.

Debit Card News, vol. 2, Issue 2, "Boatman's floats stored value into the employee incentive waters", Jul. 16, 1996.

Mickey Meece, "Boatman's prepaid cards for worker-incentive firm", American Banker, Jul. 2, 1996.

Card News, vol. 6, No. 25, "D.C. Area Safeway stores look for increase in sales volume and revenue with cards", Dec. 1991.

Spurgin, "Sopininmon! or What's happening in the retail credit card environment", Credit World Journal, Apr. 1997.

AT&T Marketing, "Universal card free lifetime membership extended 3 months", www.att.com/press/0297/970217.csa.html, Dec. 4, 1990.

Chain Store Age Executive with Shopping Center Age, "More retailers turn to co-branding", Feb. 1, 1995.

Introducing SpendingMoney(TM), Armetta: Marketing & Design Product Concept Report, Oct. 9, 1996.

First USA Platinum Connect, First USA Bank, First USA Promotional Mailing, Oct. 1997.

Introducing the First USA Platinum Connect Card, First USA Promotional Mailing, Dec. 1997.

Here's the calling convenience you asked for: 1-800-call-AT&T . . . For All Calls, Appendix A: For Card Carriers.

Beth Piskora, Debit Cards Seen Poised for New Markets, American Banker, pp. 16, Mar. 7, 1995.

Nick Rosen, Cash Just Isn't Flexible Enough: Shops of the Future Will Only Take Cards, Daily Express: Technology Section, Feb. 10, 1995.

Phil Britt, Competing in Auto Lending, America's Community Banker, vol. 5, No. 11, pp. 33-37, Nov. 1, 1996.

Miriam Krenin Souccar, Smart Cards: 1st Union Smart Card Pilot Enlists a Second Army Base, American Banker.

First Union Issues Smart Cards to Fort Benning Recruits, CardFax.

Emerson Brown and Jim Baum, Purchasing Card Magic: Eli Lilly Finds Accounts Payable Flying High With Plastic, Corporate Cashflow.

International Search Report for Application No. PCT/US01/03587 filed on Feb. 9, 2000 and dated Apr. 27, 2001.

International Preliminary Examination Report for Application No. PCT/USO1/03587 filed on Feb. 9, 2000 and dated Jul. 18, 2002.

Christine Dugas, Payroll May Ask: Paper or Plastic?, USA Today, 3B, Aug. 14, 2001.

PCT-International Search Report dated Dec. 9, 2002 for Application No. PCT/US02/16242, filed May 23, 2002.

Tim Weiner, Mexico seeks lower fees on funds sent form U.S., NYTimes.com, 5 pages, Mar. 3, 2001.

Visa Cash, printed Feb. 23, 2001, www.visa-asia.com, 3 pages.

Consortium created to manage common electronic purse specifications, CardTech SecureTech, Chicago, May 11, 1999, printed Feb. 23, 2001, www.visa.com, 4 pages.

Visa releases visa cash electronic purse specification based on CEPS; Common electronic purse specifications used as basis for next generation Visa Cash product, San Francisco, Apr. 12, 1999, printed Feb. 23, 2001, www.visa.com, 3 pages.

AAA stored value cards, printed Mar. 13, 2001, www.storedvalue. aaa.com, 6 pages.

ICL, Understanding the benefits, "Smartcity offers a number of important benefits to both the card issuers and the customers," printed Feb. 27, 2001, www.icl.com, 2 pages.

Press releases '99, "Proton world and Europay to co-operate in creation of new CEPS-compliant E-purse application," printed Feb. 23, 2001, Waterloo, Belgium, Jun. 28, 1999, 2 pages.

Machlis et al., "Will smart cards replace ATMs?," Computerworld, printed Feb. 23, 2001, 3 pages.

Business Times, "Electronic purse can free you from ATM drag," printed Feb. 23, 2001, 1 page.

Machilis, Computerworld, "Have it the 'smart' way: Burger King program drives smart-card use,", printed Feb. 23, 2001, 1 page.

Visa first to lauch electronic purse load via GSM mobile phone, Johannesburg, Apr. 7, 1999, printed Feb. 23, 2001, www.cellular.co, 4 pages.

ECARD, Frequently asked questions, printed Feb. 23, 2001, 7 pages.

SK100 Smart Card Electronic Purse Balance Reader, printed Feb. 23, 2001, 1 page.

"The Electronic Purse Reaches the Car Park", printed Feb. 23, 2001, 2 pages.

Stuber, Bank of Canada, "The electronic purse: An overview of recent developments and issues," Technical Report No. 74, Jan. 1996, printed Feb. 23, 2001, www.bankofcanada.ca, 2 pages.

Press Release, Apr. 21, 1997, Smart card for loyalty and e-purse applications eclipses capability of conventional mag-stripe cards, printed Feb. 23, 2001, 3 pages, www.1.slb.com.

Sanchez-Klein, "Electronic purse alliance planned," Computerworld, Jul. 29, 1998, printed Feb. 23, 2001, 2 pages.

Hansell, New York Times, "Visa to unveil electronic purse cards," printed Feb. 23, 2001, 2 pages.

Visa international and SERMEPA announce plans for cross border visa cash based on CEPS, printed Feb. 23, 2001, www.visa.com. 4 pages.

SCIA (Smart Card Industry Association), About Smart Cards, "Electronic Purse," printed Feb. 23, 2001, www.scia.org, 1 page.

Cordis, Pace IST-1999-11531 Pace, "Purse application for cross border use in euro," printed Feb. 23, 2001, www.cordis.lu, 3 pages.

News Clippings, "'Electronic purse card' to be launched tomorrow," New Straits Times, Sep. 18, 1999, printed Feb. 23, 2001, 3 pages.

Brehl, "Banks issue cash-card pledge," The Toronto Star, Thursday, Oct. 9, 1997, 1 page.

SmartAxis, Load cash on to your e-purse card, Supported Currencies and Schemes, printed Feb. 23, 2001, www.smartaxis.co.uk, 9 pages.

Van Hove, Electronic purses: (Which) way to go? FirstMonday: Peer-Reviewed Journal on the Internet, printed Feb. 23, 2001, www.firstmonday.dk, 32 pages.

Common Electronic Purse Specifications, Business Requirements, Version 6.0, Dec. 1998, Copyright CEPSCO 1999, 6 pages.

Banerjee, Smart card standards and electronic purse, A review paper, May 1997, printed Feb. 23, 2001, www.aston.ac.uk, 21 pages.

PCT Written Opinion for PCT Application No. PCT/US02/16242 mailed Sep. 18, 2003.

* cited by examiner

SYSTEM AND METHOD FOR CURRENCY SELECTABLE STORED VALUE INSTRUMENT

CONTINUING DATA

This application claims the benefit of the filing date of U.S. Provisional application Ser. No. 60/292,528 filed on May 23, 2001

FIELD OF INVENTION

The invention relates to the field of financial systems, and more particularly to a stored value instrument whose currency may be selected at time of loading, or at other times.

BACKGROUND OF THE INVENTION

A stored value card is a known type of instrument that may be used for purchasing goods or services via electronic payment systems, or for transporting cash value from one location to another. Stored value cards may be distinguished from credit cards and debit cards. Unlike credit or debit cards, for example, a stored value card may locally store a dollar amount or other representation of current value on the card itself. Each time a portion of the value is redeemed, the stored value may be decremented by the amount of redemption. In some stored value card implementations, the stored value card may be disposable—designed to be discarded once the stored value has been exhausted. In other applications, the stored value card may be reloadable. Telephone calling cards, bus fare cards, commuter train fare cards, meal cards and gift cards are all examples of applications that may be implemented as stored value platforms.

In modem society, persons frequently travel from one country to another for business or personal reasons. Moreover, persons often desire to use or send cash equivalents across national borders. Stored value cards that are purchased, or have value loaded, in one country may be physically compatible with card readers in another country. This may be possible, for example, where a single merchant or service provider such as the VISA™ network has implemented a substantially similar system in more than one country. Such a possibility may also be facilitated by industry efforts aimed at standardizing the stored value card-to-reader interfaces. Unfortunately, even where such compatibility exists between the stored value cards and hardware readers, cross-border use may not be possible where the currencies of the two countries are not the same. For example, a card that is loaded with U.S. dollars may not be redeemable for goods, services, or cash where the local currency is in Mexican pesos or other denominations.

Wire services and other types of electronic funds transfer, money orders, bank drafts, and other mechanisms or instruments are also currently used to transport cash or cash equivalents from one country to another. Unfortunately for the sender and recipient, these alternatives are generally available only at a relatively high transaction cost, and often only at a relatively small number of fixed locations.

These and other drawbacks exist.

SUMMARY OF THE INVENTION

The invention overcoming these and other problems in the art relates to a system and method for a currency selectable stored value instrument, whose currency may be chosen or converted at the time value is loaded, after load but prior to redemption of value, at the time of redemption, or at other times. The stored value instrument may be in the form of a card made from plastic, paper, or other material.

In order to obtain the card, the user can walk into a bank branch and obtain the card directly from a bank teller. Alternatively, the user can obtain the card from equipment adapted to dispense a stored value card, This equipment could be located within a bank branch, at a retail location, or at any other location. As an additional alternative, the user can access a bank branch by a remote method, such as by email, over the Internet, or by phone to obtain the card. The bank or other issuing institution can issue the card directly upon receiving payment from a user. The payment may be in the form of cash, check, or credit card, or can be taken from an existing customer account.

The stored value instrument may be a plastic card with a magnetic stripe, compatible with card readers on Automated Teller Machines (ATMs), point of sale (POS) terminals and other hardware. The system may further contain processors, databases and other resources which are a component of, or in communication with, ATMs and other terminals configured to effect currency conversions. One or more databases may store current account value, PINs (personal identification numbers) and other information related to an account or other facility. In one illustrative embodiment, U.S. dollars may be converted to Mexican pesos when the stored value instrument is loaded or read with a card reader, an ATM or a card dispensing machine. A user may subsequently redeem that value for legal tender in pesos at a card reader or an ATM located in Mexico, for example, or for goods or services. The account may be loaded with, or converted to, other desired currencies.

An object of the invention in one regard is to reduce the cost associated with the transfer of cash or cash equivalents across national borders, for instance where a person in the United States wishes to remit cash to family members or others located in Mexico.

Another object of the invention is to make such transfers more convenient for persons sending, receiving, or redeeming cash or cash equivalents.

Another object of the invention is to make the transport of cash or cash equivalents safe and secure from theft, fraud, or other abuses or difficulties.

Another object of the invention is to facilitate the growth of stored value instrument applications in border towns, resort areas, or other locations where travel between nations is widespread.

Yet another object of the invention is to expand business opportunities for banks or other financial institutions that provide currency exchange services. Other objectives may be realized.

BRIEF DESCRIPTION OF THE DRAWINGS

The invention will be described with reference to the accompanying drawings, in which like elements are referenced with like numbers.

DETAILED DESCRIPTION OF PREFERRED EMBODIMENTS

Figure 1:
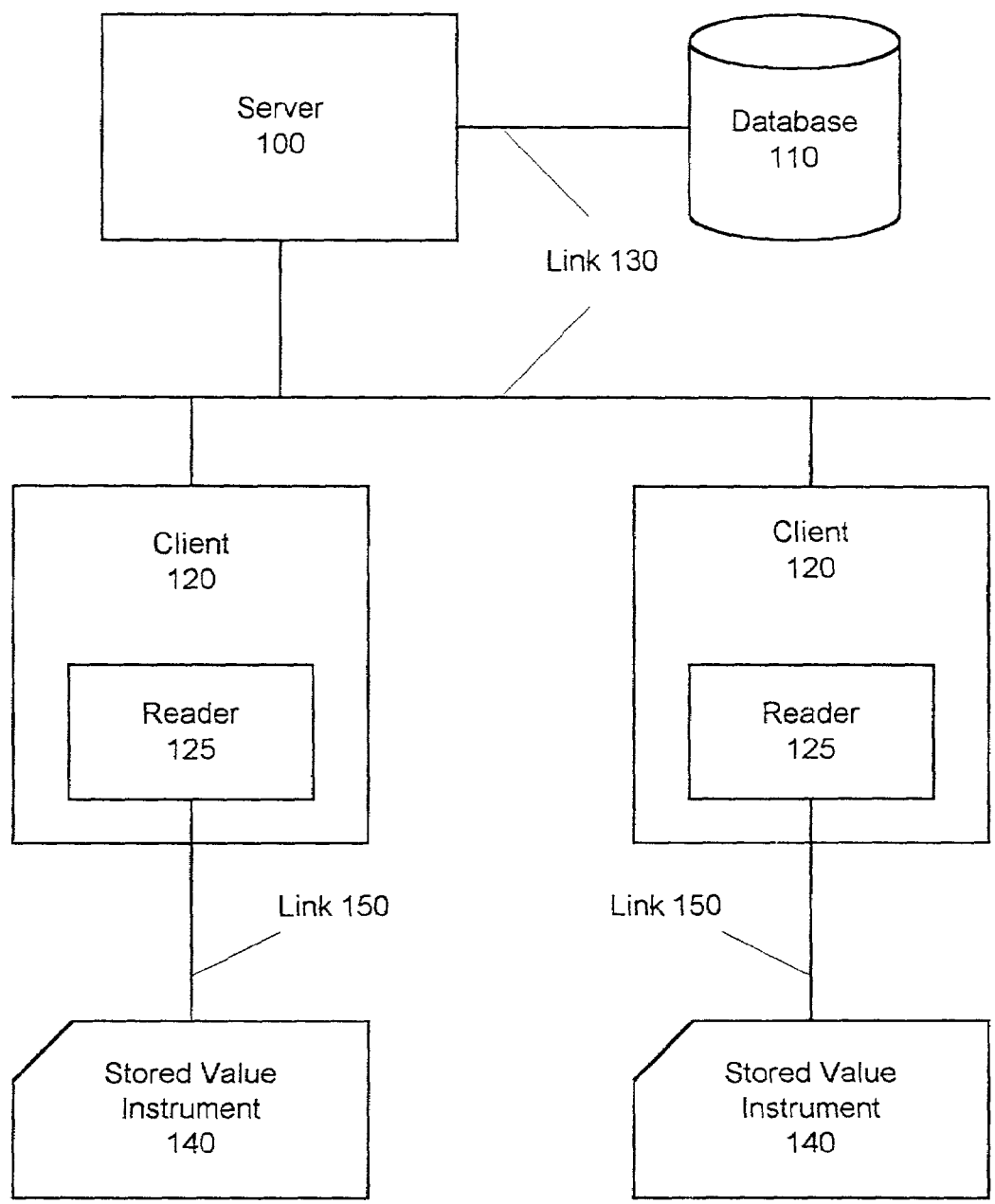
FIG. 1 illustrates a system architecture diagram, according to one embodiment of the invention.

FIG. 1 illustrates an overall architecture of a system through which the invention may be implemented, wherein a server 100 may be linked to clients 120 via a communications link 130. In other embodiments, multiple servers or more than two clients may be deployed. The server 100 may be linked with a database 110 over the communication link 130 as shown. In some embodiments, clients 120 may be configured to perform some or all of processing and storage functions which might otherwise be performed in server 100 and database 110, respectively. Accordingly, in this instance, connection to a server and database would be unnecessary.

Server 100 may host applications facilitating financial transactions for banks, merchants, or other entities. Such applications may be related to the transfer of funds between accounts or facilities, for the conversion of currency, or to perform other functions. Server 100 may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

Additionally, server 100 may interface to database 110. Database 110 may maintain financial account data, currency conversion rates, facilities for the storage of electronic cash, personal identification numbers (PINs) or other information. Database 110 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a SAN (Storage Area Network), Microsoft Access™ or others may also be used, incorporated or accessed in the invention.

Clients 120 may include customer terminals located at a bank or other financial institution, or at other convenient locations, for example in the case where the stored value instrument is to be redeemed for cash. Clients 120 may also be located at the point of sale for goods or services. Furthermore, clients 120 may be fixed or portable terminals owned or used by users of the system and method and located at various locations. Clients 120 may be or include, for instance, an ATM (Automated Teller Machine) or other terminal equipped to dispense funds. Clients 120 may also be or include a PC (Personal Computer) running the Microsoft Windows™ 95, 98, Millenium™, NT™, or 2000, Windows™CE™, PalmOS™, Unix, Linux, Solaris™, OS/2™, BeOS™, MacOS™ or other operating system or platform. Clients 120 may include a microprocessor such as an Intel x86-based device, a Motorola 68K or PowerPC™ device, a MIPS, Hewlett-Packard Precision™, or Digital Equipment Corp. Alpha™ RISC processor, an Intel pentium®, pentium® II, pentium® III or pentium® IV processor, a microcontroller or other general or special purpose device operating under programmed control. Clients 120 may furthermore include electronic memory such as RAM (Random Access Memory) or EPROM (Electronically Programmable Read Only Memory), storage such as a hard drive, CDROM or rewritable CDROM or other magnetic, optical or other media, and other associated components connected over an electronic bus, as will be appreciated by persons skilled in the art. Clients 120 may also be or include a network-enabled appliance such as a WebTV™ unit, radio-enabled Palm™ Pilot or similar unit, a set-top box, a networkable game-playing console such as Sony Playstation™ or Sega Dreamcast™, a browser-equipped cellular telephone, or other TCP/IP client or other device. Clients 120 may also be, include or interface to a wired digital or analog telephone, or a wireless digital or analog telephone such as a cellular telephone or a satellite telephone.

Different embodiments of the invention may vary as to the nature of stored value instrument 140. For example, stored value instrument 140 may be a card, which may preferably be fabricated of plastic. Stored value instrument 140 may contain at least one resource for storing data. In one embodiment of the invention, the storage resource may be a magnetic stripe embedded in or attached to stored value instrument 140. In another embodiment, the storage resource may be electronic or magnetic structures in the interior of a stored value instrument. Stored value instrument 140 may also include a processor, for example in a smart card configuration. Moreover, stored value instrument 140 may be physically or electronically configured in a way that is compatible with an industry standard, such as Proton, Mondex, CEPS (Common Electronic Purse Specifications), or other standard familiar to those skilled in the art.

In embodiments where stored value instrument 140 is implemented as a card, clients 120 may also be, include, or interface to readers 125. Readers 125 may be adapted to communicate via link 150 with stored value instrument 140. Together, readers 125 and link 150 may effectuate the transfer of value or other data from a client 120 to stored value instrument 140. Reader 125 and link 150 may also read data from the memory of stored value instrument 140. Some embodiments of the system may include more than two stored value instruments. Link 150 may be consistent with alternative embodiments of communication link 130 described below, with industry standards indicated above, or with other schemes recognized in the art. Alternatively, the stored value instrument 140 is inserted directly into the reader 125, thereby rendering the link 150 an electronic, magnetic, optical, or other type of reading device.

In one embodiment of the invention, stored value instrument 140 may not be or include a card, but rather, stored value instrument 140 may include an index to an account or other facility, for example on database 110, for storing value. In other embodiments, stored value instrument 140 may be or include both a card and an account or other facility, cooperating to execute the functions described herein.

Data stored on or in stored value instrument 140 may include, for example, an account holder's name, account number, a numerical representation of currently stored value, an indication of the type of currency stored on the instrument, a PIN, or other data, or any subset of data utilized by the method or methods disclosed herein.

Server 100, database 110, and clients 120 may communicate via communications link 130. Communications link 130 may be, include or interface to any one or more of, for instance, the Internet, an intranet, a PAN (Personal Area Network), a LAN (Local Area Network), a WAN (Wide Area Network) or a MAN (Metropolitan Area Network), a SAN (Storage Area Network), a frame relay connection, an AIN (Advanced Intelligent Network) connection, a SONET (Synchronous Optical Network) connection, a digital T1, T3, E1 or E3 line, DDS (Digital Data Service) connection, DSL (Digital Subscriber Line) connection, an Ethernet connection, an ISDN (Integrated Services Digital Network) line, a dial-up port such as a V.90, V.34 or V.34bis analog modem connection, a cable modem, an Asynchronous Transfer Mode connection, or an FDDI (Fiber Distributed Data Interface) or CDDI (Copper Distributed Data Interface) connection. Communications link 130 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (Cellular Digital Packet Data), a RIM (Research in Motion, Limited) duplex paging type device, a Bluetooth, BlueTeeth or WhiteTooth radio link, or an IEEE 802.11-based radio frequency link. Communications link 130 may yet further be, include or interface to any one or more of an RS-232 serial connection, an EEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection. Communications link 130 may further be, include, or interface to a PSTN (Public-Switched Telephone Network).

In embodiments of the invention, the type of communication between system components represented by communication link 130 may be implemented in different ways. Moreover, in embodiments, it may not be necessary that all components communicate directly with each other. For example, it may not be necessary that each of clients 120 communicate with each other.

Server 100 and clients 120 may utilize network enabled code in order to facilitate functionality in a network-based environment. Network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™, Common Gateway Interface (CGI) or other compilers, assemblers, interpreters or other computer languages or platforms.

Figure 2:
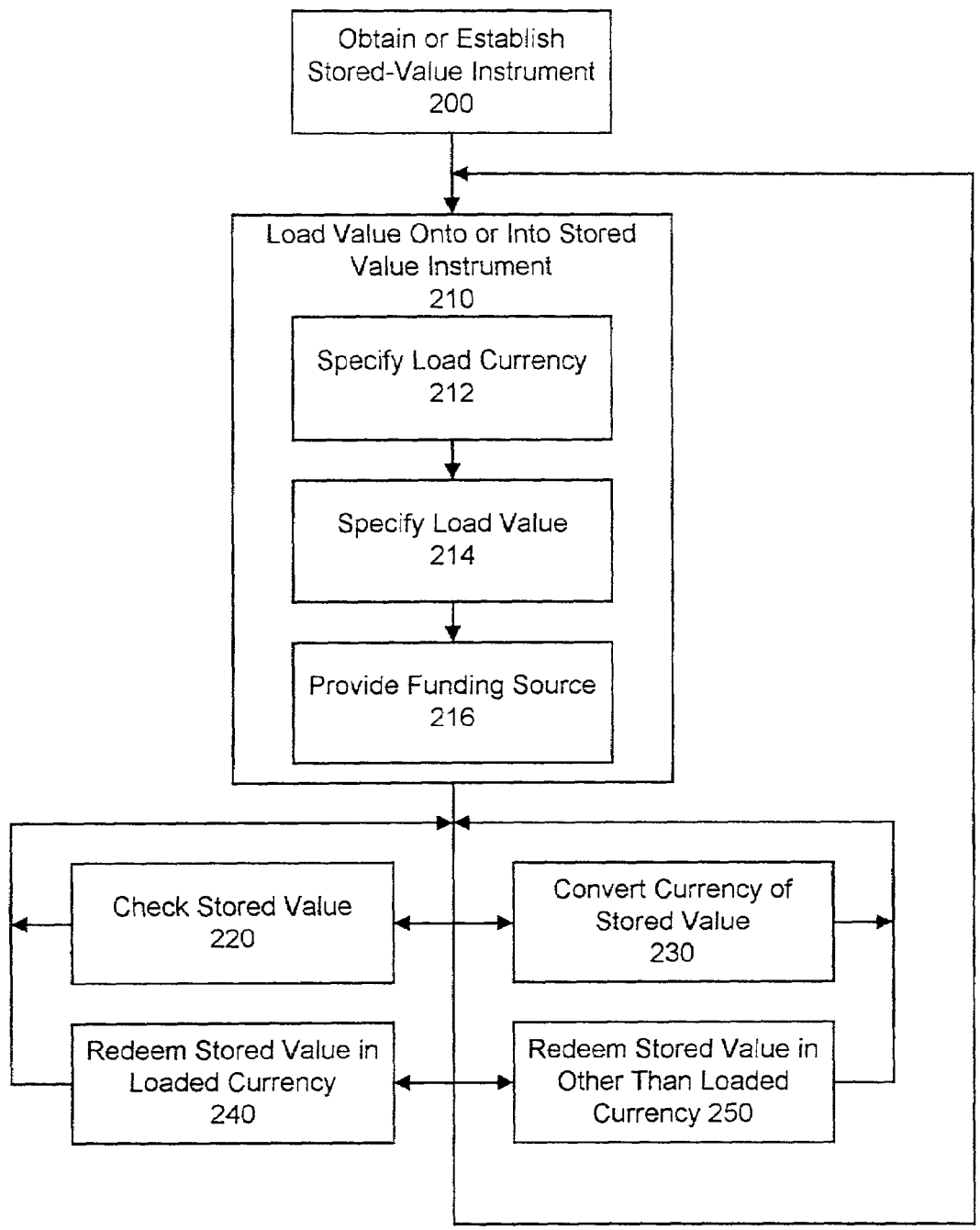
FIG. 2 illustrates a process flow diagram from the perspective of a stored value instrument user, according to one embodiment of the invention.

FIG. 2 is a process flow diagram from the perspective of a stored value instrument user, according to one embodiment of the invention. In step 200, a user may obtain or establish a stored value instrument 140. In one embodiment of the invention, stored value instrument 140 may be obtained or established via remote application in step 200. For example, an application may be sent to a service provider via conventional mail, electronic mail, or a Web-based utility. Alternatively, the application may be submitted in hard copy at a banking or other site. Upon approval, one or more of stored value instrument 140 may be mailed or delivered to the applicant or established on the applicant's behalf. Additionally, in embodiments a PIN may be sent via conventional mail, electronic mail, or other technique, but preferably separate from any mailing or delivery of stored value instrument 140 to that same applicant. Additionally, step 200 may be effectuated by a card dispensing machine, an ATM or other client 120 configured to dispense or establish stored value instrument 140. In embodiments of the invention, stored value instrument 140 may be obtained or established in person, for example from a teller at a bank, financial institution, or other service provider in step 200.

Step 210, loading value onto or into stored value instrument 140, may be performed subsequent to the time that stored value instrument 140 is obtained or established, as illustrated in FIG. 2. In another embodiment of the invention, step 210 may be performed coincident with step 200 obtaining or establishing a stored value instrument 140, in a manner consistent with alternatives previously described. In step 210, a person seeking to load value onto or into stored value instrument 140 may be required to specify, among other things, load currency in step 212, load value in step 214, and a funding source in step 216. In step 212, for instance, a user may specify that value is to be loaded in Mexican pesos, British pounds sterling, German marks, francs, euros, or any other currency or denomination. In step 214, a user may specify the value of the load currency. In one embodiment of the invention, value expressed in step 214 may be in the same currency as the load currency. In another embodiment of the invention, value expressed in step 214 may be in a currency which is other than the load currency. In a case where Mexican pesos are specified as the load currency, and where 520 U.S. dollars are specified as the load value, for instance, stored value instrument 140 may be loaded with 5,000 pesos (if appropriate under the exchange rate at the time of the transaction). In step 216, the owner of the stored value instrument 140 may specify a funding source such as a checking account, savings account, money market account, brokerage account, credit account, or other account from which funds can be drawn. In another embodiment of the invention, a customer may provide actual cash or a credit card in step 216 to provide value for loading onto or into stored value instrument 140.

Like step 200 related to obtaining or establishing a stored value instrument 140, step 210 related to loading value onto or into a stored value instrument 140 may be performed remotely or in person. Remote operation might be implemented, for example, where client 120 is, includes, or interfaces to a wired telephone in communication with a PSTN, a wireless telephone, a PDA, or other wireless device with Internet access, a personal computer with Web access, or an ATM. Moreover, where the transaction is performed remotely, or where the funding source is held by other than the stored value instrument provider, there may be a delay between the time of the load request in step 210, and the availability of funds on or in stored value instrument 140. In another embodiment of step 210, stored value instrument 140 may be loaded in person, for example by a teller at a bank, financial institution, or other service provider.

Figure 3:
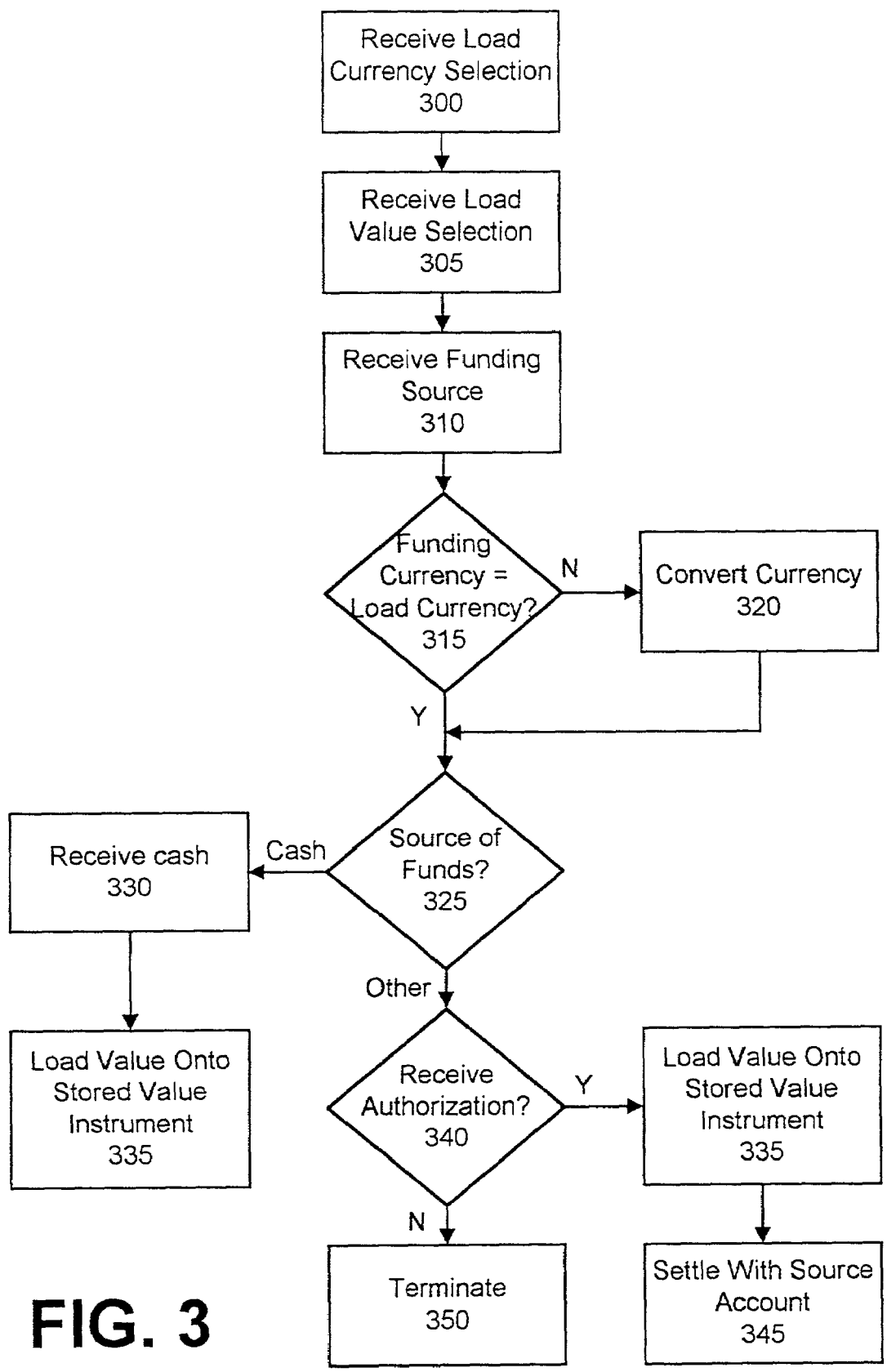
FIG. 3 illustrates a process flow diagram from the perspective of a provider of stored value instrument services, illustrating how value may be loaded onto or into a stored value instrument, according to one embodiment of the invention.

Subsequent processes to effectuate the load of value onto stored value instrument 140 are described in FIG. 3 and the accompanying text.

FIG. 2 illustrates that, once value has been loaded onto or into stored value instrument 140 in step 210, a user of stored value instrument 140 may proceed to at least any of five steps represented by step numbers 210, 220, 230, 240, and 250. Of course, in embodiments of the invention, all alternatives may not be available and in others, further alternatives presented.

A user may load value onto or into stored value instrument 140, in step 210, subsequent to an initial load. In one embodiment, additional value may be loaded in the same currency. In other embodiments, it may be possible in step 210 to load value onto or into stored value instrument 140 in a currency different from what has already been loaded onto or into stored value instrument 140.

In one embodiment of the invention, a fee may be charged at issuance of the card or other instrument in step 200. In another embodiment of the invention, a fee may be charged each time that value is loaded onto the stored value instrument in step 210.

In step 220, a user may check the balance of stored value. In one embodiment, inquiries may be made remotely in step 220, for instance in the same way that balances are checked in conventional bank accounts. In embodiments where stored value instrument 140 is or includes a card, it may be necessary to interface stored value instrument 140 to reader 125 in order to perform step 220. In the instance where stored value instrument 140 is a card containing a magnetic stripe, and where the magnetic stripe contains at least an indication of stored value, it may not be necessary for client 120 to be connected via link 130, since, in one embodiment, client 120 and reader 125 may read the balance of stored value directly from stored value instrument 140. In other embodiments, it may be necessary to the execution of step 220 for client 120 to communicate with server 100 or database 110 over link 130, where, for example, stored value instrument 140 is not or does not include a card containing an indication of stored value, or where stored value instrument 140 is an account or other facility and does not include a card at all. In other embodiments of the invention, a user of stored value instrument 140 may check the remaining value in step 220 by making an in person inquiry at a bank, financial institution, or other service provider.

In step 230, a user of stored value instrument 140 may convert the currency of stored value. An illustration is where Mexican pesos were loaded originally, and a user wishes to convert the currency of the loaded value to British pounds without redeeming value in exchange for goods, services, or cash.

In step 240, a user may redeem some or all of the stored value on or in stored value instrument 140 in the loaded currency. For example, where the stored value is loaded in Mexican pesos, a user may redeem stored value for goods or services in Mexico City, where the local currency is also in pesos, or a user may redeem stored value for cash pesos at a Mexican ATM or card reader.

Figure 4:
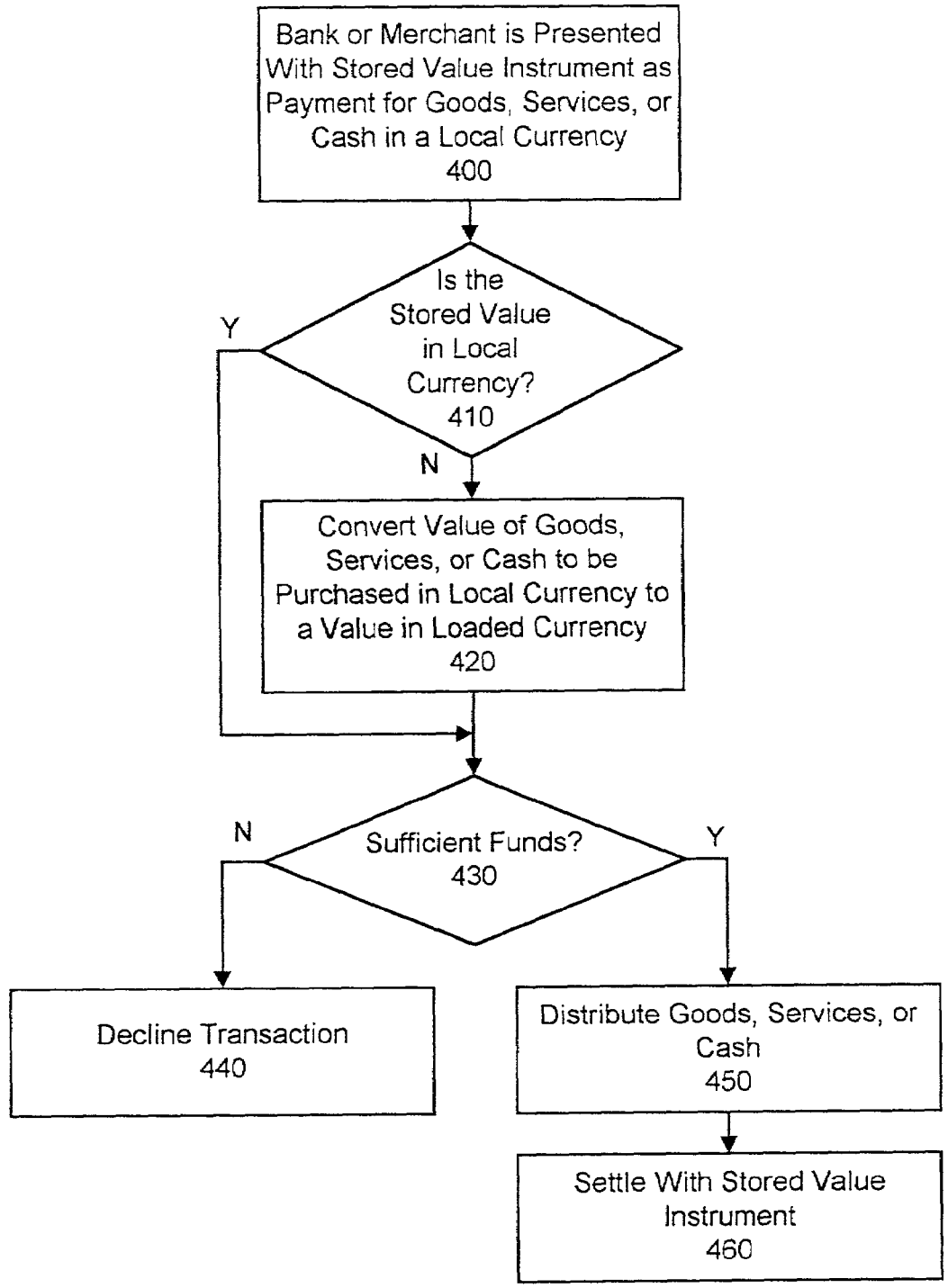
FIG. 4 illustrates a process flow diagram from the perspective of a provider of stored value instrument services, illustrating how value may be redeemed from a stored value instrument, according to one embodiment of the invention.

In step 250, a user may redeem stored value from stored value instrument 140 in other than the loaded currency. If, for instance, stored value instrument 140 was loaded with value in Mexican pesos in anticipation of a trip to Mexico that was subsequently cancelled, a user may redeem the stored value in exchange for U.S. dollars at an ATM or a card reader in the U.S. A process for effectuating such a request is illustrated in FIG. 4.

In the steps set forth above, the user of the stored value instrument 140 may be the same person who purchased the card, if for instance, the purchaser has traveled to another country which uses different currency. Alternatively, the purchaser may transfer the stored value instrument 140 to an acquaintance in another to thereby easily, efficiently, and securely transport funds between countries.

FIG. 3 is a process flow diagram from the perspective of a provider of stored value instrument services, illustrating how value may be loaded onto or into stored value instrument 140, according to one embodiment of the invention. In steps 300, 305, and 310, the service provider or service provider system may receive the load currency selection, load value selection, and funding source information, respectively. Information in these steps may be the result of user input in step 210, previously described.

In step 315, the service provider or service provider system may decide whether the funding currency is the same as the load currency. If it is, then the process may advance to step 325. If not, for example where the funding source is in U.S. dollars, and Mexican pesos are to be loaded onto stored value instrument 140, then the process may advance to step 320.

In step 320, a calculation may be made to convert the value of load currency into the funding currency. For example, if a user has requested a loaded value of 5,000 pesos, and the funding source is in U.S. dollars, step 320 may calculate that 5,000 pesos is equivalent to 520 U.S. dollars.

In step 325, the service provider or service provider system may resolve the nature of the funding source. If the source of funds is cash, then the cash may be collected in step 330, and the corresponding value may be loaded onto stored value instrument 140 in step 335. In the example immediately above, 520 U.S. dollars in legal tender would be collected, and 5,000 Mexican pesos would be loaded onto or into stored value instrument 140. If, on the other hand, the funding source is a checking, savings, brokerage, credit, or other account, then authorization step 340 may be necessary to verify that the account has sufficient funds before loading value onto or into stored value instrument 140. Where authorization step 340 is able to verify funds, value may be loaded onto or into stored value instrument 140 in step 335, and the bank, financial institution, or other service provider may then settle or otherwise reconcile with the source account in step 345. Where authorization step 340 is unable to verify sufficient funds, the loading process illustrated in FIG. 3 may be terminated in step 350.

FIG. 4 is a process flow diagram from the perspective of a provider of stored value instrument services, illustrating how value may be redeemed from stored value instrument 140, according to one embodiment of the invention. The process may start, in step 400, when a bank, other financial institution, or merchant is presented with a stored value instrument 140 as payment for goods, services, or cash in local currency.

In step 410, the bank, other financial institution, or merchant may check to see whether the stored value is in local currency. In one embodiment, step 410 may be an online transaction that may require communication with a funding source. In another embodiment of step 410, a reader 125 may read an indication of currency from the memory of a stored value instrument 140 that is or includes a card.

If the stored value is in the local currency, then the process may be promoted to step 430; if the stored value is not in local currency, then the process may advance to step 420. In step 420, the value of goods, services, or cash to be purchased in local currency may be converted to the currency of the stored value. For example, if a user is seeking to exchange stored value in the currency of Mexican pesos for 200 British pounds sterling cash, step 420 may calculate that 200 British pounds sterling is equivalent to 2,800 Mexican pesos.

In step 430, the value of goods, services, or cash may be compared to the stored value, in the currency of the stored value. Thus, in the immediately preceding example, it may be decided in step 430 that a stored value instrument 140 loaded with value of 5,000 Mexican pesos would be sufficient funds to purchase 200 British pounds sterling legal tender. Where the stored value funds are sufficient, the requested goods, services, or cash may be distributed in step 450, and, in step 460, the transaction may be settled or otherwise reconciled, for example by transferring 2,800 Mexican pesos from stored value instrument 140 to an account of the bank, other financial institution, or merchant.

Of course, if stored value instrument 140 does not have sufficient funds to cover the transaction, then the transaction may be declined in step 440.

The foregoing description of the invention is illustrative, and variations in configuration and implementation will occur to persons skilled in the art. For instance, stored value instrument 140 may be implemented in various physical and electronic formats other than those specifically described. Moreover, while the invention has been described with respect to loading or conversion from one original currency to one converted currency, in embodiments of the invention multiple currencies may be used or selected as originating currency, the currency which is converted into or both. The scope of the invention is accordingly to be limited only by the following claims.

The invention claimed is:

1. A system for processing currency selectable stored value instruments, comprising:
   at least one transaction server;
   an interface to at least one client terminal connected to the at least one transaction server via a communications link;
   means for loading value onto a currency selectable stored value instrument or onto an account associated therewith using the at least one client terminal, the value loading means requesting a user of the instrument to specify a load currency, a load value, and a funding source;
   means for determining if the load value, the load currency and the funding source are in the same currency;
   first means for converting the load currency at the time of loading if it is different from the funding source and for converting the load value at the time of loading if it is in a different currency than the load currency;
   second means for converting the currency of the value on the currency selectable stored value instrument or on the account associated therewith to a different currency, the conversion taking place after the value is loaded but prior to redemption; and
   third means for converting the currency of the value on the selectable stored value instrument or on the account associated therewith to a different currency, the conversion taking place at the time of redemption.

2. The system of claim 1, wherein the at least one client terminal comprises a card dispensing machine.

3. The system of claim 1, wherein the currency selectable stored value instrument comprises a card having at least one of an electronic storage device, a magnetic storage device, and an optical storage device.

4. The system of claim 3, wherein the currency selectable stored value instrument further comprises a processor.

5. The system of claim 1, wherein the at least one client terminal comprises an automated teller machine.

6. The system of claim 1, wherein the currency selectable stored value instrument comprises a card having a magnetic stripe.

7. The system of claim 1, further comprising means for redeeming value on the stored value instrument.

8. The system of claim 7, wherein the means for redeeming value comprises means for redeeming value in a second currency different from the loaded currency.

9. The system of claim 1, further comprising means for reporting the value currently loaded on the currency selectable stored value instrument.

10. A system for processing currency selectable stored value instruments, comprising:
    at least one transaction server;
    an interface to at least one client terminal connected to the at least one transaction server via a communications link;
    means for loading value onto a currency selectable stored value instrument or onto an account associated therewith using the at least one client terminal, the value loading means requesting a user of the instrument to specify a load currency, a load value, and a funding source;
    means for determining if the load value, the load currency, and the funding source are in the same currency;
    first means for converting the load currency at the time of loading if it is different from the funding source and for converting the load value at the time of loading if it is in a different currency than the load currency;
    second means for converting the currency of the value on the currency selectable stored value instrument or on the account associated therewith to a different currency, the conversion taking place after the value is loaded but prior to redemption; and
    third means for converting the currency of the value on the selectable stored value instrument or on the account associated therewith to a different currency, the conversion taking place at the time of redemption.

11. The system of claim 10, wherein the at least one client terminal comprises a card dispensing machine.

12. The system of claim 10, wherein the currency selectable stored value instrument comprises a card having at least one of an electronic storage device, a magnetic storage device, and an optical storage device.

13. The system of claim 12, wherein the currency selectable stored value instrument further comprises a processor.

14. The system of claim 10, wherein the at least one client terminal comprises an automated teller machine.

15. The system of claim 10, wherein the currency selectable stored value instrument comprises a card having a magnetic stripe.

16. The system of claim 10, further comprising means for reporting the value currently stored on the currency selectable stored value instrument.

17. A computer-implemented method for processing currency selectable stored value instruments using at least one client terminal, comprising the steps of:
    loading value onto a currency selectable stored value instrument or onto an account associated therewith in a first currency selected from at least two currencies by specifying a load currency, a load value; and a funding source;
    determining whether the load value, the load currency, and the funding source are in the same currency;
    converting the load currency at the time of loading if it is different from the funding source;
    converting the load value at the time of loading if it is in a different currency than the load currency;
    converting the currency of the value on the currency selectable stored value instrument or on the account associated therewith to a different currency, the conversion taking place after the value is loaded but prior to redemption;
    converting the currency of the value on the selectable stored value instrument or on the account associated therewith to a different currency at the time of redemption; and
    redeeming value on the currency selectable stored value instrument in a second currency that differs from the first currency.

18. The method of claim 17, further comprising the step of reporting the value currently stored on the currency selectable stored value instrument.

19. The method of claim 17, wherein step of specifying load value identifies a load value in a currency other than the specified load currency.

20. The method of claim 17, wherein step of specifying a funding source identifies funds stored in a currency other than the specified load currency.

21. A computer-implemented method for loading value and converting currency stored on a currency selectable stored value instrument or in an account associated therewith using at least one client terminal, comprising the steps of:
   a) receiving a load currency selection;
   b) receiving a load value selection;
   c) receiving a funding source selection;
   d) determining whether the load value, the load currency, and the funding source are in the same currency;
   e) reconciling the respective currencies of the load currency, load value, and funding source selections, wherein reconciliation shall comprise at least two conversions if the respective currencies are different from each other, and at least one conversion if any two of the respective currencies are the same;
   f) receiving cash or funds for loading;
   g) loading value onto the currency selectable stored value instrument or onto an account associated therewith; and
   h) receiving a conversion selection to convert the currency of the value on the currency selectable stored value instrument to a different currency, the conversion taking place at the time the value is loaded or subsequent to loading.

22. The method of claim 21 further comprising receiving a conversion selection to convert the currency of the value on the currency selectable stored value instrument to a different currency, the conversion taking place after the value is loaded but prior to redemption.

23. The method of claim 21 further comprising receiving a conversion selection to convert the currency of the value on the currency selectable stored value instrument to a different currency, the conversion taking place at the time of redemption.

24. A method for loading value onto and converting currency stored on a stored value instrument or on an account associated therewith using at least one client terminal, comprising the steps of:
   a) receiving a load currency selection;
   b) receiving a load value selection;
   c) determining whether the load value, the load currency and a funding source are in the same currency;
   d) receiving authorization to debit a funding source account;
   e) loading value onto the currency selectable stored value instrument or onto an account associated therewith;
   f) converting the load currency at the time of loading if it is different from the funding source;
   g) converting the load value at the time of loading if it is in a different currency than the load currency;
   h) reconciling with the funding source account; and
   i) converting the currency of the value on the currency selectable stored value instrument to a different currency, the conversion taking place after the value is loaded but prior to redemption.

25. The method of claim 24 further comprising converting the currency of the value on the currency selectable stored value instrument to a different currency, the conversion taking place at the time of redemption.

26. A method for loading value onto and converting currency stored on a currency selectable stored value instrument or on an account associated therewith using at least one client terminal, comprising the steps of:
   a) receiving a load currency selection;
   b) receiving a load value selection;
   c) determining whether the load currency, the load value and a funding source are in the same currency;
   d) converting the load value selection using a computer to a first value in the funding source currency;
   e) converting the first value to a second value in the load currency;
   f) loading the second value onto the currency selectable stored value instrument or onto an account associated therewith.

27. A method for loading value onto and converting currency stored on a currency selectable stored value instrument or on an account associated therewith using at least one client terminal, comprising the steps of:
   a) receiving a load currency selection;
   b) receiving a load value selection;
   c) determining whether the load currency, the load value, and a funding source are in the same currency;
   d) receiving notification that the funding source account is not in the same currency as the load currency;
   e) converting the load value selection to a first value in the funding source currency;
   f) converting the first value to a second value in the load currency;
   g) receiving authorization to debit the funding source account;
   h) loading the second value onto the currency selectable stored value instrument; and
   i) reconciling with the funding source account.

28. A system for converting value stored in one or more stored-value accounts, comprising:
   at least one transaction server associated with one or more stored-value accounts;
   an interface to at least one client terminal connected to the at least one transaction server via a communications link;
   means for loading value onto the one or more stored-value accounts;
   means for determining if a load value, a load currency, and a funding source are in the same currency;
   means for converting the load currency at the time of loading if it is different from the funding source and for converting the load value at the time of loading if it is in a different currency than the load currency; and
   means for converting the currency of the value on the one or more stored-value accounts to a different currency, the conversion taking place after the value is loaded but prior to redemption, at the time of redemption, or at any other time.

29. A system for processing currency selectable stored value instruments, comprising:
   at least one transaction server;
   an interface to at least one client terminal connected to the at least one transaction server via a communications link;
   means for loading value onto a currency selectable stored value instrument or onto an account associated therewith using the at least one client terminal, the value loading means requesting a user of the instrument to specify a load currency, a load value, and a funding source, the load value may or may not be of the same currency as the load currency;

means for determining whether the load currency, the load value and the funding source are in the same currency, and at least one of:

first means for converting the load currency at the time of loading if it is different from the funding source and for converting the load value at the time of loading if it is in a different currency than the load currency;

second means for converting the currency of the value on the currency selectable stored value instrument or on the account associated therewith to a different currency, the conversion taking place after the value is loaded but prior to redemption; and third means for converting the currency of the value on the selectable stored value instrument or on the account associated therewith to a different currency, the conversion taking place at the time of redemption.

30. A system for processing currency selectable stored value instruments, comprising:

at least one transaction server;

an interface to at least one client terminal connected to the at least one transaction server via a communications link;

a value loading interface for loading value onto a currency selectable stored value instrument or onto an account associated therewith using the at least one client terminal, the value loading interface requesting a user of the instrument to specify a load currency, a load value, and a funding source, the load value may or may not be of the same currency as the load currency;

means for determining whether the load currency. the load value and the funding source are in the same currency, and at least one of;

a first interface for requesting conversion of the load currency at the time of loading if it is different from the funding source and for converting the load value at the time of loading if it is in a different currency than the load currency;

a second interface for requesting conversion of the currency of the value on the currency selectable stored value instrument or on the account associated therewith to a different currency, the conversion taking place after the value is loaded but prior to redemption; and a third interface for requesting conversion of the currency of the value on the selectable stored value instrument or on the account associated therewith to a different currency, the conversion taking place at the time of redemption.

* * * * *